United States Patent [19]

Josephson

[11] Patent Number: 4,513,226
[45] Date of Patent: Apr. 23, 1985

[54] ELECTRONIC BALLAST-INVERTER CIRCUIT

[75] Inventor: Elliot Josephson, Los Altos, Calif.

[73] Assignee: Astec Components, Ltd., Santa Clara, Calif.

[21] Appl. No.: 472,153

[22] Filed: Mar. 4, 1983

[51] Int. Cl.³ .................... H05B 41/26; H05B 41/14
[52] U.S. Cl. .................... 315/219; 315/223;
315/257; 315/279; 315/DIG. 7; 363/37;
363/133; 331/114
[58] Field of Search .............. 315/219, 223, 257, 258,
315/279, DIG. 5, DIG. 7; 363/37, 133; 331/60,
114

[56] References Cited

U.S. PATENT DOCUMENTS

| 3,754,160 | 8/1973 | Jensen | 315/97 |
|---|---|---|---|
| 4,004,187 | 1/1977 | Walker | 315/205 |
| 4,051,413 | 9/1977 | Abadie | 315/219 |
| 4,060,751 | 11/1977 | Anderson | 315/209 R |
| 4,060,752 | 11/1977 | Walker | 315/244 |
| 4,127,795 | 12/1978 | Knoll | 315/210 |
| 4,199,710 | 4/1980 | Knoll | 315/205 |
| 4,237,403 | 12/1980 | Davis | 315/98 |
| 4,245,177 | 1/1981 | Schmitz | 315/205 |
| 4,259,614 | 3/1981 | Kohler | 315/219 |
| 4,259,616 | 3/1981 | Smith | 315/DIG. 7 X |
| 4,277,726 | 7/1981 | Burke | 315/DIG. 5 X |
| 4,277,728 | 7/1981 | Stevens | 315/307 |
| 4,469,988 | 9/1984 | Cronin | 315/DIG. 5 X |

Primary Examiner—David K. Moore
Assistant Examiner—Vincent DeLuca
Attorney, Agent, or Firm—Fitch, Even, Tabin & Flannery

[57] ABSTRACT

An electronic ballast-inverter circuit for powering one or more fluorescent lamps or the like includes two identical circuits operating at different DC offsets, each circuit including a tank circuit composed of a primary winding of the power transformer and a capacitor such that each tank circuit resonates at the same frequency, and including a switching transistor connected to each tank circuit. These two transistors are operative on alternate half cycles of the sine wave generated by the inverter, so as to obtain the push-pull operation needed by the inverter. Each circuit includes a base drive current source for each transistor that is controlled by the polarity of an additional primary winding of the power transformer. For improved efficiency, the circuit is designed to be operable from an unsmoothed DC voltage source.

16 Claims, 9 Drawing Figures

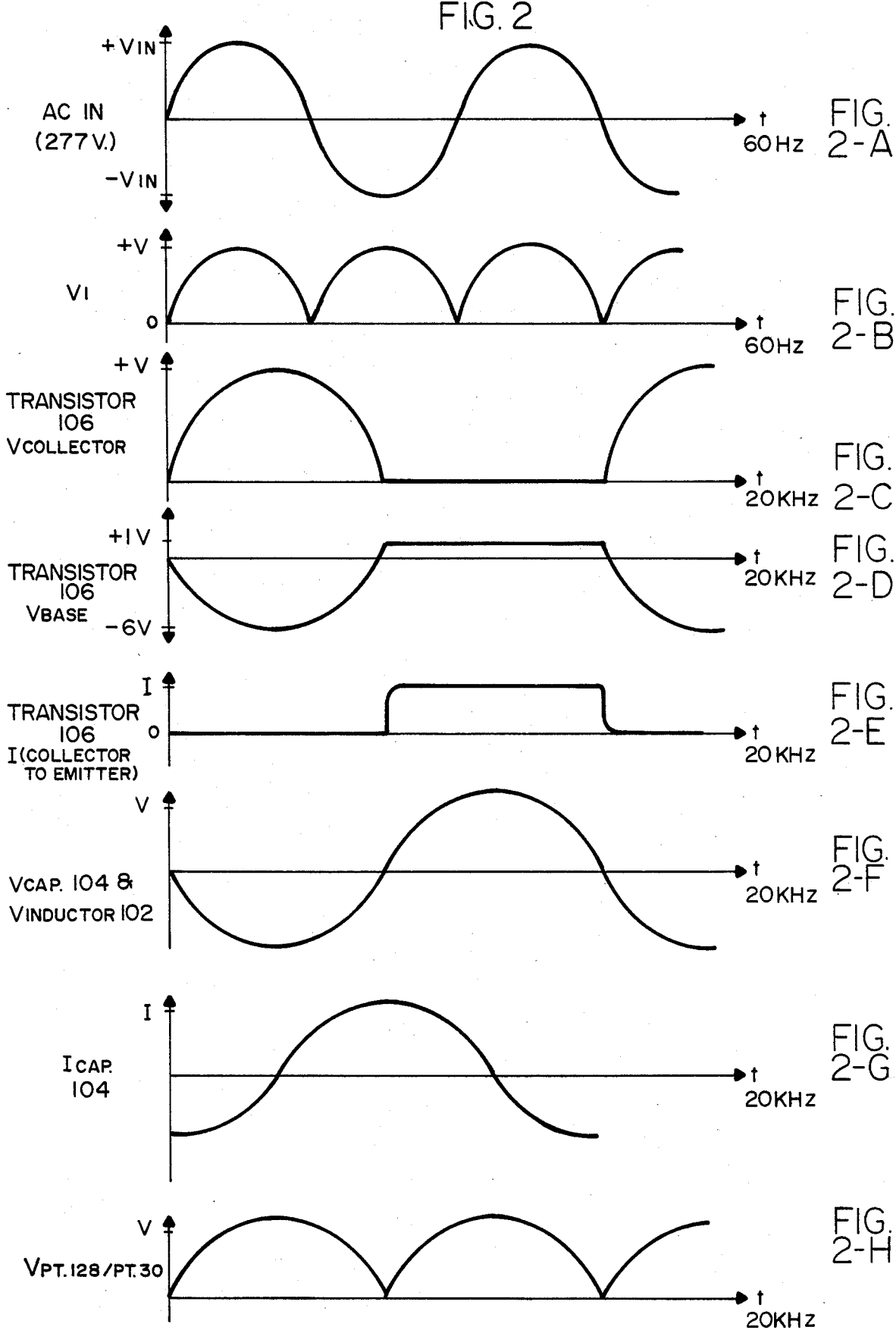

ELECTRONIC BALLAST-INVERTER CIRCUIT

BACKGROUND OF THE INVENTION

The present invention relates to an electronic ballast-inverter circuit usable for powering fluorescent lamps or the like, and more particularly to an electronic ballast-inverter designed to reduce by half the high voltage stress on the inverter power switching transistors.

High frequency electronic ballast circuits (e.g. circuits operable at a frequency of at least 20 kHz) for powering fluorescent lamps generally provide the advantages of higher efficiencies and smaller size when compared with older 60 Hz ballast circuits. These high frequency ballast circuits, which usually include DC to AC inverters, have shortcomings in other areas, however, such as in the area of switching losses in the power switching transistors usually used in such applications, when operating at the power levels required by the fluorescent lamps. Such circuits have also generally been sensitive to the amplitude of the DC source voltage, in that a change in voltage will adversely affect the frequency of operation of such circuits. Third, these circuits generally have a very poor crest factor since they draw current from the AC supply in short bursts every half cycle of the input voltage, whereby the circuit (particularly if a large number of them are used) can adversely affect the input supply waveform. Fourth, it can be difficult to satisfactorily design these circuits to have a sufficiently high power factor. Fifth, where the inverter includes a pair of push-pull transistors, the base drive to each is usually through a resistor, an arrangement which creates an excessive amount of heat under certain conditions.

The reliability and efficiency of these circuits is also not good, in particular due to the need, in general, for an electrolytic capacitor at the input to the circuit for smoothing of the rectified AC sine wave power source. Although certain electronic ballast circuits have been designed so as to omit the need for an electrolytic capacitor, the use of the resultant unsmoothed or pulsed DC voltage has created the danger that both transistors in a push-pull inverter may go off at the same time, such that the voltage across each of the transistors will go up until breakdown occurs, thereby damaging the circuit. A circuit which overcomes many of the above described problems is described in applicant's copending U.S. patent application Ser. No. 204,561, now U.S. Pat. No. 4,388,562.

For circuits designed to operate at higher input DC source voltage levels, however, even this latter circuit may not be usable, due to the high voltage transients on the input power line which may be coupled across the transistor, where such transients are beyond the maximum voltage rating of the transistors. For example, when the on switch of a power supply is closed, the switch bounce inherent in this switch could create voltage transients exceeding 1,000–2,000 volts across the power transistor as a result of the inductance of the power line. Transistors rates to resist breakdown at the 2,000 volt level, for example, are not generally available at this time.

One method known in the prior art for reducing the adverse effect of power line voltage transients is to use a bridge inverter instead of the typical parallel transistor inverter. The bridge inverter provides the benefit that each transistor in the bridge inverter is subjected only to the voltage supply during cutoff because there is no induced voltage present derived from the operation of the power transformer. Thus, bridge inverters operate safely with twice the supply voltage for a given transistor type. A primary disadvantage of the bridge inverter, however, is its greater complexity, including the fact that it requires four transistors, instead of the two required in a normal parallel inverter, to provide the same power conversion. Half bridge converters are known in the art, but they have the disadvantage of being only able to generate a square wave output. Such an output creates harmonic distortion and inefficient power transfer to the fluorescent lamps. Half-bridge converters also do not provide for rapid turn off of the switching transistors, thereby ading to the inefficiencies inherent in such circuits.

SUMMARY OF THE INVENTION

The present invention is directed towards providing the beiefits of a bridge inverter in allowing a given transistor type to operate at the equivalent of twice its normal voltage rating, while minimizing the complexity of the circuit. The present invention enables such operation using only two transistors rather than the four required for a bridge type inverter.

The electronic ballast-inverter circuit according to the present invention includes two separate circuits operating alternatively in a push-pull manner wherein one circuit is DC offset from the other circuit so that each of the power transistors only switches one half of the DC source voltage. Each of the circuits includes a tank circuit composed of a capacitor and a respective one of two primary windings in the power transformer of the inverter. Also included are means for controlling the coupling of current to the base of each transistor so as to enable them to operate alternatively, and also to provide rapid turn off of a transistor when the other transistor has turned on. The circuit is also designed to operate with unsmoothed DC, to thereby increase its efficiency.

Therefore, an object of the present invention is to provide an electronic ballast-inverter circuit for powering one or more fluorescent lamps that will operate at twice its normal voltage rating without the need for the complexity and increased expense of a bridge type inverter.

Another object of the present invention is to overcome the disadvantages of prior art ballast circuits by providing an electronic ballast circuit wherein the frequency of the inverter is substantially independent of the amplitude of the DC source voltage, and wherein, due to the absence of the need to provide smoothing, no electrolytic capacitor is needed across the input to the inverter, thereby improving circuit reliability and efficiency and reducing its cost.

Still another object of the present invention is to provide an electronic ballast-inverter circuit for fluorescent lamps wherein means are provided for protecting each of the two push-pull transistors in the inverter from voltage breakdown.

A still further object of the present invention is to provide an electronic ballast-inverter circuit in which means are provided for starting each circuit both when power is initially turned on, and thereafter whenever the DC source voltage drops substantially to zero.

These and other objects and advantages of the present invention will become more apparent upon reference to the accompanying drawings and the following description of the preferred embodiment.

BRIEF DESCRIPTION OF THE DRAWINGS

FIGS. 2A to 2H show representative waveforms present in the circuit of FIG. 1.

DESCRIPTION OF A PREFERRED EMBODIMENT

Figure 1:
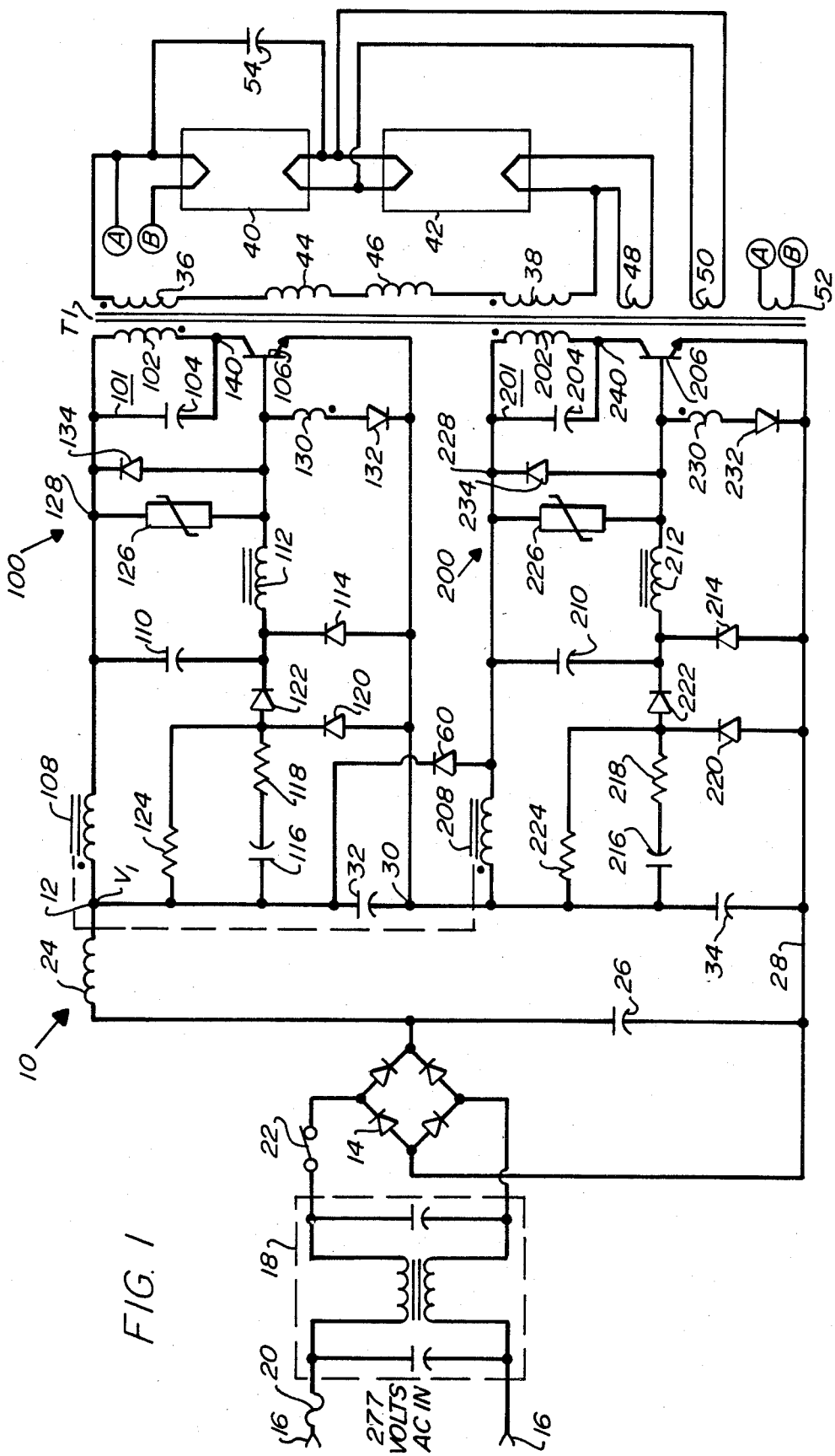
FIG. 1 is a circuit diagram of an electronic ballast circuit according to the present invention.

Referring now FIG. 1, shown is an electronic ballast-inverter circuit 10 according to the present invention. The present invention may be powered from a conventional AC power source which is then rectified to provide the DC source voltage used by the inverter circuit 10. It is envisioned that the improved circuit according to the present invention will be used in areas where higher input voltage levels are experienced, e.g. AC voltage levels on the order of 277 volts RMS. The DC source voltage V1, which is input to the inverter circuit 10 at the power input terminal 12, is preferrably generated from a conventional rectifier means comprising a full wave diode bridge 14. Diode bridge 14 has coupled to it an AC input voltage which is supplied to a pair of input terminals 16 from the AC power source. A conventional EMI filter means 18 may be connected between terminals 16 and rectifier means 14. A fuse 20 and a thermal cutout switch 22 may also be added to provide further protection for the components of the ballast-inverter circuit 10.

For further protection, an inductor 24 and a capacitor 26 may be connected on the output of the rectifier means 14. Inductor 24 is connected in series between the output of rectifier means 14 and input terminal 12 and provides further series filtering to filter out any high voltage transients appearing on either side of that inductor. Capacitor 26 is added between rectifier means 14 and a ground return terminal 28 to further smooth out the high frequency voltage transients on this line. In this context, it should be noted that although the present invention is operable using a filtered DC source voltage, as described above, it is desirable to operate the present invention, for efficiency of power consumption, from a pulsed DC, i.e. using the unsmoothed AC full wave rectified voltage output by the rectifier means 14. Consequently, an electrolytic capacitor is not needed on the output of the rectifier means 14. Capacitor 26 operates only as a high frequency filter for preventing any signal generated by the ballast-inverter according to the present invention from feeding back onto the AC input power line. It does not filter the input DC voltage in the manner of an electrolytic capacitor. Consequently, the value of this capacitor 26 need only be high enough to provide a low impedance path to the ground return terminal 28 at the high operating frequency of the inverter circuit 10 according to the present invention.

The ballast-inverter 10 according to the present invention includes two substantially identical circuits shown at 100 and at 200. Each circuit 100, 200 is designed to function in an identical way but in alternating cycles of the output sine wave. The two circuits 100 and 200 are connected to the input DC voltage source in a manner so as to enable them to operate at different DC offsets from one another. Specifically, the upper circuit 100 is designed to operate off of the voltage amplitude appearing between the power input terminal 12 and an intermediate terminal 30, while the lower circuit 200 is designed to operate off of the voltage amplitude existing between the intermediate terminal 30 and the ground return terminal 28. This DC voltage offset is enabled by capacitors 32 and 34, capacitor 32 being connected between the power input terminal 12 and the intermediate terminal 30 and capacitor 34 being connected between the input terminal 30 and the ground return terminal 28.

The inverter 10 also includes a transformer T1 which includes two 42 turn primary windings, windings 102 and 202, and two 51 turn secondary windings 36 and 38. Two fluorescent lamps, indicated at 40 and 42, are shown connected in an exemplary manner in series with the two secondary windings 36 and 38. Also in series with these components are two ballast inductors 44 and 46 which are operable in a conventional manner to enable operation of the fluorescent lamps 40 and 42. Also shown are conventional filament heater secondary windings 48, 50 and 52 for initial heating of the filaments of the fluorescent lamps 40 and 42 to facilitate rapid, non-destructive starting of these lamps. Finally, a capacitor 54 may be connected in parallel with lamp 40 to substantially short out this lamp during initial start up of the circuit. That is, in a conventional manner, capacitor 54 enables substantially all of the initial voltage generated on start-up to appear only across fluorescent lamp 42 to facilitate its rapid turn on. This is necessary because both lamps initially appear to be substantially open circuits, and do not reduce to a substantially lower impedance until ignition of the lamp has been established. That is, a higher voltage is required to ignite the lamp than is required to maintain its operating state once ignition has occurred. Capacitor 54 facilitates this process.

The first circuit 100 according to the present invention includes a tank circuit 101 comprising a capacitor 104 in parallel with primary winding 102. The values of primary winding 102 and capacitor 104 are chosen to provide a predetermined resonant frequency equal to the desired frequency of operation of the output sinusoid fed to the fluorescent lamp or lamps to be powered by the inverter circuit 10. In a preferred embodiment, as mentioned above, it is believed that a resonant frequency of at least 20 kHz is preferable for the operation of this circuit. The components of this tank circuit are therefore chosen to produce a resonant frequency in this frequency range. The first circuit 100 also includes a transistor switch 106 that is associated with the tank circuit 101. As can be seen, one side of tank circuit 101, point 128, is connected to the power input terminal 12 via an inductor 108, and the other side of tank circuit 101, point 140, is connected to the collector of transistor 106. The emitter of transistor 106 is connected to the intermediate terminal 30. Note that some other type of solid state switch, such as an SCR or power FET, could be used in place of transistor 106 in circuit 100, in a manner known to those skilled in the art.

Similarly, the second circuit 200 according to the present invention also includes a tank circuit, shown at 201, comprising a capacitor 204 in parallel with primary winding 202. The values of primary winding 202 and capacitor 204 are chosen to provide the same resonant frequency as that chosen for tank circuit 101. The primary windings 102 and 202 need to be closely coupled together to ensure this operation. The second circuit 200 also includes a transistor or other solid state switch 206 that is associated with the tank circuit 201. As can be seen, one side of tank circuit 201, point 228, is connected to the intermediate terminal via an inductor 208, and the other side of tank circuit 201, point 240, is connected to the collector of transistor 206. The emitter of transistor 206 is connected to the ground return terminal 28.

Inductors 108 and 208 are necessary to enable the tank circuits 101 and 201 to operate at voltage ranges exceeding the power input voltage V1. In addition, inductors 108 and 208 are wound as bifilar windings on a common core to maximize the coupling between these two components. The current that is driven through one of these inductors 108, 208 during one half cycle of the inverter according to the present invention needs to be coupled to the other respective inductor 108, 208 during the second half cycle of the inverter. This cross-coupling construction enables this result. Further details concerning the operation of inductors 108 and 208 are given below.

As will also be described in more detail hereinbelow, the base of transistor 106 (as well as transistor 206) is driven from one of four current sources. The main current source to transistor 106 comprises capacitor 110, inductor 112 and diode 114, with this network of components providing current during the normal operation of circuit 100 for driving the base of transistor 106 when it is turned on. Two other current sources are provided, and function to start or restart the switching action of transistor 106. Capacitor 116, resistor 118 and diodes 120 and 122 operate as a current source to provide current to the base of transistor 106 whenever the DC voltage source V1 at power input terminal 12 has just begun rising from substantially 0 volts (which it will do 120 times a second since it is a 60 Hz signal). Resistor 124 provides another current path to start the operation of transistor 106 when power is first coupled to circuit 100 or thereafter if the circuit stalls at some point other than when V1 is approximately 0 volts. Voltage dependent resistor 126 provides a fourth current path to the base of transistor 106 to protect transistor 106 if it inadvertently has turned off and the voltage at point 128 at the top of tank circuit 101 has risen above a predetermined safe level.

The identical current paths to those described with respect to circuit 100 operation are provided in circuit 200 for driving the base of transistor 206. The main current source to transistor 206 comprises capacitor 210, inductor 212 and diode 214, with this network of components providing current during the normal operation of circuit 200 for driving the base of transistor 206 when it is turned on. Two other current sources are provided to provide starting current for transistor 206. Capacitor 216, resistor 218 and diodes 220 and 222 operate as a current source to provide current to the base of transistor 206 whenever the voltage source at the intermediate point 30 has just begun rising from substantially 0 volts, which it will also do 120 times a second. Resistor 224 provides another current path to start the operation of transistor 206 when power is first initiated to circuit 200 or thereafter if the circuit stalls at some point other than when V1 is approximately 0 volts. Voltage dependent resistor 226 provides a fourth current path to the base of transistor 206 to protect transistor 206 if it has inadvertently gone off and the voltage at the top of tank circuit 201, indicated as point 228, rises above a predetermined safe level.

Diode 60, connected between point 228 and the input terminal 12, functions as a clamp to ensure that the voltage at point 228, the top of tank 201, is never significantly higher in voltage than the voltage at terminal 12. This protects the circuit from unexpected voltage transients that may otherwise cause the second circuit 200 to operate at a higher voltage than the first circuit 100.

To provide control of the current coupled to the base of transistor 106, an additional primary winding, shown at 130 and preferably having one or two turns, is connected between the base of transistor 106 and the intermediate terminal 30 to provide a steering means for this current. Also included in series with coil 130 is a diode 132. As will be described in greater detail hereinbelow, coil 130 and diode 132 function to divert base current from transistor 106 during alternate half cycles of the output sine wave, generated by inverter 10, when transistor 106 is to be held off and transistor 206 is on. This is because capacitor 110 and inductor 112 continue to act as a current source during this half cycle of inverter 10 for delivery of current to the base of transistor 106. Coil 130 functions to deliver this current out to intermediate terminal 30 when transistor 106 is off since the voltage across the primary windings 102, 202 also appears across coil 130. The polarity of this coil 130 voltage controls this pulling out of current from the base of transistor 106. Diode 132 merely provides a DC offset generating means to match the base to emitter voltage drop of transistor 106.

Similarly, another additional primary winding, shown at 230, is connected in series with a diode 232 between the base of transistor 206 and the ground return terminal 28 to control the current coupled to the base of transistor 206, and thus provide a steering means for this current. The operation of this coil and diode is as described above with respect to coil 130 and diode 132, except that components 230 and 232 maintain transistor 206 off and the current flowing through coil 230 during opposite alternate half cycles of the output sine wave generated by the inverter 10 according to the present invention.

Referring again to circuit 100, a diode 134 is connected between the base of transistor 106 and point 128 at the top side of the tank circuit 101. This diode provides means for causing the rapid switching off of transistor 106 when a half cycle of the output sine wave has been completed. This diode functions to pull current out of the base of transistor 106 to provide very rapid turn off of this transistor and to provide a path for the current flowing in this transistor back to the top of tank circuit 101. A diode 234 is connected between the base of transistor 206 and point 228 at the top side of tank circuit 201 to provide the same function in circuit 200.

The ballast-inverter 10 according to the present invention operates in the following manner. For simplicity of description, the operation of only one of the two circuits 100, 200 will be described. It should be understood that the other circuit will operate in essentially an identical manner, but only in an opposite half cycle of the output sine wave, i.e. 180° out of phase. During normal operation, with the circuit already operating, both tank circuits 101 and 201 would be oscillating. Assume for the purpose of explanation that transistor 106 has just turned on. Transistor 106 creates thereby a conductive path between its collector, point 140, and the intermediate terminal 30, the ground point for circuit 100. This causes current to flow through the transistor from the tank circuit out to the intermediate terminal 30. The other side of the tank circuit, at point 128, is swinging in a half sine wave starting off from 0 volts going through a positive peak of up to 600 volts, depending on the present voltage of the unsmoothed DC voltage V1, and then back down to 0 volts at the end of the sine wave half cycle. The frequency of this sine wave corresponds to the resonant frequency of tank circuit 101. See, e.g., FIG. 2H, which illustrates an exemplary voltage waveform between point 128 and intermediate terminal 30.

More specifically, when transisor 106 goes on, there is no voltage across capacitor 104 since both sides of the capacitor are at 0 volts at that point. In other words, at that point there is a maximum current in the primary winding inductor 102. Then current flows into capacitor 104 building up its voltage until it reaches a peak, which may be upwards of 600 volts, at the top of the sine wave. The capacitor then begins to discharge, with the current flowing back into inductor 102, causing it to store an increasing amount of current until the voltage again drops to 0. See, e.g., FIGS. 2F and 2G, which illustrate capacitor 104 operation. At that point we would like the transistor 106 to turn off. In normal tank circuit operation, the tank current would simply flow from inductor 102 back into capacitor 104 in the reverse direction, causing capacitor 104 to charge up in an opposite direction. With transistor 106 still on, however, when point 128 has gone to zero volts at the end of the half cycle of the sine wave, it is going to want to continue below that point in response to the current still flowing in the tank, since point 140 is clamped by transistor 106. As a result, point 128 will continue to go down below zero volts, causing diode 134 to conduct, to provide the current path from the base of transistor 106 back to point 128, to cause transistor 106 to switch off quickly. This current though diode 134 continues to flow until transistor 106 actually does turn off thereby decoupling the voltage at point 140 from the base of transistor 106. FIG. 2C illustrates the collector voltage at point 140 of transistor 106.

When the voltage of point 128 goes lower than the voltage at point 140, the polarity of inductor 130 also switches, since the voltage appearing across the primary windings 102 and 202 is now reversed. This creates a negative voltage bias at the base of transistor 106 with respect to intermediate terminal 30, causing the current provided by inductor 112 to flow through coil 130 and diode 132 into intermediate terminal 30 instead of into the base of transistor 106. Diverting current in this manner from the base of transistor 106 acts to hold off transistor 106 so long as the voltage polarity of coil 130 remains with its dot side positive. FIG. 2D shows the voltage variation seen at the base of transistor 106.

As mentioned above, inductor 108 acts to couple power to tank circuit 101 and power transistor 106 from the power input terminal during one of two half cycles of the output sine wave (power is coupled to tank circuit 201 and transistor 206 via inductor 208 during the other half cycle). During the half cycle when transistor 106 is on, therefore, it causes current to be pulled through inductor 108 and tank circuit 101 essentially independent of the tank circuit current that is normally flowing in the tank. An example of the current through transistor 106 is shown in the current curve of FIG. 2E. It is this latter current that is inductively coupled to secondary windings 36 and 38 of transformer T1 by primary winding 102 to power flourescent lamps 40 and 42.

Inductor 108 further acts to isolate the sine wave oscillations of tank circuit 101 from the 60 Hz pulsating DC source voltage at the power input terminal 12.

Without inductor 108, the voltage across inductor 102 would be limited to the maximum RMS voltage of the DC voltage source. This would cause tank circuit 101 to essentially operate as a square wave inverter rather than a sine wave inverter. In addition, inductor 108 acts to limit the current to tank circuit 101 to thereby protect transistor 106 from drawing a maximum current from the DC power source. Without current limiting, transformer T1 could become saturated, such that the impedance of windings 102 and 202 would disappear. The result would be that the input power source would be connected directly across the collector of transistor 106 without resistive loading, thereby enabling excessive current to flow through transistor 106. The probable result is that transistor 106 would be rapidly destroyed.

In addition to providing the base current to enable transistor 106 to turn on and stay on during alternate half cycles at the 20 kHZ tank circuit frequency, inductor 112 also assists in turning on transistor 106 when the DC input voltage V1 at power input terminal 12 goes to 0 volts 120 times a second. After V1 goes to zero volts, inductor 112 continues to output current for a short time. Tank circuit 101 will also generally ring (continue to oscillate) for a short time after power is removed. This ringing helps to steer the current output by inductor 112 and 212 to either transistor 106 or 206, depending on the polarity of the voltage across coils 102 and 202, and thereby the polarity across corresponding coils 130 and 230.

Capacitor 110 acts as a current source, since point 128 is going from a ground potential up to a high voltage level. Of course, point 128 will make this positive going transition once every cycle at the tank circuit frequency. As previously mentioned, the maximum voltage that point 128 will normally reach depends on the voltage level of the DC input voltage existing at terminal 12, which will vary from a low of 0 volts to a normal high of between 250 and 500 volts. Consequently, for a small capacitor, one normally will obtain a fairly large amount of current passing through capacitor 110, i.e. on the order of 300 milliamps peak, and the current is in the form of a square wave. Diode 114 acts as a half wave rectifier enabling capacitor 110 to conduct current only in the forward direction into inductor 112. In summary, capacitor 110 acts as a source for the primary running current for the base of transistor 106 during its normal switching operation.

Capacitor 116, resistor 118, and diodes 120 and 122 provide starting current for the base of transistor 106 via inductor 112 at those times when the DC voltage V1 is starting at 0 volts. This current is limited by resistor 118. This current flows through diode 122, inductor 112, and into the base of transistor 106. Diode 122 prevents current generated by capacitor 110 from flowing in any direction except through inductor 112. Diode 120 allows current to flow only in the forward direction through capacitor 116.

During the initial start up of the inverter 10, additional current may be required to start up the circuit 100 according to the present invention, and this current is provided by means of resistor 124. Resistor 124 is a high impedance resistor, e.g. 150 kilohms, which is connected in parallel with capacitor 116 and resistor 118. More importantly, however, resistor 124 provides current to the base of transistor 106 if the circuit stalls, i.e. if both transistors 106 and 206 are off at any point other than when the input voltage is at 0 volts. The resistance of resistor 124 is high enough so that little current flows through this resistor during the normal start up operation. This current path is needed because, at higher voltage levels, insufficient current may be available from the starting means, comprising capacitor 116 and resistor 118, to turn on transistor 106 without such assistance.

During initial startup, the current provided by capacitor 116 is designed to be sufficient to supply enough starting current to drive the base of transistor 106. Since the corresponding components in circuit 200 are designed to supply the same starting current to the base of transistor 206, and since one of the two transistors 106, 206 will always have a slightly higher gain than the other, the transistor having such higher gain will turn on first. As this transistor goes on, it will cause a voltage drop in the 42 turn winding of its corresponding tank circuit (winding 102 or 202), which then couples this voltage back to steering windings 130 and 230. This reinforces the flow of current into the transistor that has gone on, and ensures that the other transistor remains off for a complete sine wave half cycle.

Another protective device for transistor 106 is voltage dependent resistor 126. Resistor 126 provides another path for current to flow into the base of transistor 106. Resistor 126 is designed to operate when current is flowing in inductor 108 and neither transistor 106 and 206 is on. If resistor 126 were not there, this current would cause the voltage at point 128 to rapidly increase to destructive levels. Consequently, resistor 126 operates to create a current path to the base of transistor 106 whenever point 128 goes above a certain predetermined voltage, e.g. 600 volts. At this point, resistor 126 begins to conduct, dumping current into the base of transistor 106. This causes transistor 106 to turn on in the same manner as the starting circuit would.

FIGS. 2A–2H illustrate certain of the waveforms present in the electronic ballast circuit 10 according to the present invention. FIG. 2A shows the input 60 Hz AC sine wave power source, while FIG. 2B illustrates the operation of the rectifier means 14 on this AC input voltage, creating a full wave rectified AC sine wave. This constitutes the umsmoothed 60 Hz DC voltage V1 which appears at power input terminal 12. FIGS. 2C–2G illustrate the operation of exemplary portions of circuit 100 according to the present invention. Specifically, FIG. 2C illustrates the voltage at point 140, the collector of transistor 106, with respect to intermediate terminal 30. This voltage varies at the 20 kHz tank circuit frequency rate, corresponding to the switching rate of transistor 106. As is seen, with transistor 106 on, its collector is clamped to "ground", that is, to intermediate point 30. With transistor 106 off, its collector is allowed to float, such that point 140 floats as high as 600 volts in response to the operation of tank circuit 101. FIG. 2D illustrates the voltage appearing at the base of transistor 106. With transistor 106 on, the base is biased slightly positive due to diode 132. When coil 130 changes polarity, the base reflects the increasingly negative voltage across this coil. FIG. 2E illustrates the current flowing through transistor 106 from its collector, point 140, to its emitter, which is tied to intermediate terminal 30, during its normal switching operation. FIGS. 2F and 2G illustrate respectively the voltage across, and the current through, capacitor 104 in tank circuit 101. This current is substantially independent of the current that flows through tank circuit 101 and into transistor 106. FIG. 2H illustrates the voltage across the tank circuit and transistor 106, between point 128 and intermediate terminal 30.

Various modifications of the invention in addition to those shown and described herein will become apparent to those skilled in the art from the foregoing description and accompanying drawings. Such modifications are intended to fall within the scope of the appended claims.

What is claimed is:

1. An inverter circuit for powering one or more fluorescent lamps or the like comprising:

a DC voltage source including a power input terminal and a ground return terminal;

a transformer having first and second primary windings and at least one secondary winding adapted to be connected in series with a fluorescent lamp;

a first circuit including a first tank circuit having a predetermined resonant frequency, a first inductor connected in series between one side of said first tank circuit and said power input terminal and a first transistor connected to the other side of said first tank circuit operative when turned on to switchably connect said second side of said first tank circuit to an intermediate potential terminal, said first tank circuit comprising a first capacitor connected in parallel with said first primary winding;

a second circuit including a second tank circuit having a resonant frequency identical to said first tank circuit, a second inductor inductively coupled to said first inductor and connected in series between one side of said second tank circuit and said intermediate potential terminal, and a second transistor connected to the other side of said second tank circuit operative when turned on to periodically switchably connect said second side of said second tank circuit to a ground return terminal of said DC source, said second tank circuit comprising a second capacitor connected in parallel with said second primary winding;

means for generating a DC voltage offset between said first circuit means and said second circuit means such that a first portion of said DC source voltage amplitude exists between said power input terminal and said intermediate terminal and a second portion of said DC source voltage amplitude exists between said intermediate terminal and said ground return terminal; and means for alternately turning on said first transistor and said second transistor at a rate determined by the resonant frequency of said first and second tank circuits.

2. The inverter circuit of claim 1 further comprising means for enabling the operation of said first and second circuit means from an unsmoothed DC voltage source.

3. The inverter circuit of claim 1 further comprising means for causing the rapid switching off of each said first and second transistor, said means including a first diode connected between the base of said first transistor and said one side of said first tank circuit, and including a second diode connected between the base of said second transistor and said one side of said second tank circuit, each said diode oriented to conduct current in the direction from the base of its respective transistor to its associated said tank circuit.

4. The inverter circuit of claim 1, wherein said means for generating a DC voltage offset between said first circuit means and said second circuit means comprises a third capacitor connected between said power input terminal and said intermediate terminal and a fourth capacitor connected between said intermediate terminal and said ground return terminal.

5. The inverter of claim 4 further comprising a clamping diode connected from said one side of said second tank circuit to said power input terminal and oriented to create a conductive path from said second circuit to said power input terminal whenever the voltage at said one side of said second tank circuit exceeds the voltage at said power input terminal.

6. The inverter circuit of claim 1, wherein said means for alternately turning on said first transistor and said second transistor comprises:
first current source means capacitively fed from said one side of said first tank circuit to the base of said first transistor for generating a current of sufficient amplitude to turn on and maintain on said first transistor;
second current source means capacitively fed from said one side of said second tank circuit to the base of said second transistor for generating a current of sufficient amplitude for turning on and maintaining on said second transistor; and
steering means for alternately coupling the current generated by said first current source means to the base of said first transistor and the current generated by said second current source means to the base of said second transistor.

7. The inverter circuit of claim 6 wherein said steering means comprises third and fourth primary windings of said transformer, each inductively coupled to each other and to the first and second primary windings of said transformer such that the voltage across said first and second primary windings appears across said third and fourth primary windings, said third primary winding connected between the base of said first transistor and said intermediate terminal, said fourth primary winding connected between the base of said second transistor and the ground return terminal, each said third and fourth primary windings connected so as to have opposite polarity such that when said first transistor is on, said fourth primary winding couples the current from said second current source to the ground return terminal instead of to said second transistor and, when said second transistor is on, said third primary winding couples the current from said first current source to the intermediate terminal instead of to said first transistor.

8. The inverter circuit of claim 7 further comprising a first diode connected in series with said third primary winding, said third diode oriented so as to provide a positive bias voltage for the base of said first transistor, and a second diode connected in series with said fourth primary winding, said fourth diode oriented so as to provide a positive bias voltage for the base of said second transistor.

9. The inverter of claim 6 wherein said first current source means comprises a third capacitor connected between said one side of said first tank circuit and the base of said first transistor, and wherein said second current source means includes a fourth capacitor connected between said one side of said second tank circuit and the base of said second transistor, said inverter circuit further comprising means for enabling the operation of said first and second circuit means from an unsmoothed DC voltage source, said means including a third inductor connected in series between said third capacitor and the base of said first transistor operative for maintaining current to the base of said first transistor for a length of time after the voltage at the power input terminal drops below a minimum voltage, and a fourth inductor connected in series between said fourth capacitor and the base of said second transistor operative for maintaining current to the base of said second transistor for a length of time after the voltage at said intermediate terminal drops below a minimum.

10. The inverter of claim 1 further comprising:
starting means for forcing one of said first and second transistors to turn on whenever the voltage at the power input terminal is increasing from substantially 0 volts, said means including a third capacitor, a first resistor and a first diode connected in series between said power input terminal and said first transistor, and a fourth capacitor, a second resistor and a second diode connected in series between said intermediate terminal and said second transistor.

11. The inverter of claim 1 further comprising means for preventing breakdown across said first transistor and said second transistor, said means comprising first means for detecting an overvoltage at said one side of said first tank circuit, means for generating a current in response thereto, and means for coupling this current to the base of said first transistor, and comprising second means for detecting an overvoltage at said one side of said second tank circuit, means for generating a current in response thereto, and means for coupling this current to the base of said second transistor.

12. An inverter circuit for powering one or more fluorescent lamps or the like comprising:
a DC voltage source including a power input terminal and a ground return terminal;
a transformer having first and second primary windings and at least one secondary winding adapted to be connected in series with a fluorescent lamp;
a first circuit including a first tank circuit having a predetermined resonant frequency, a first inductor connected in series between one side of said first tank circuit and said power input terminal and a first switch means connected to the other side of said first tank circuit operative when turned on to switchably connect said second side of said first tank circuit to an intermediate potential terminal, said first tank circuit comprising a first capacitor connected in parallel with said first primary winding;
a second circuit including a second tank circuit having a resonant frequency identical to said first tank circuit, a second inductor inductively coupled to said first inductor and connected in series between one side of said second tank circuit and said intermediate potential terminal, and a second switch means connected to the other side of said second tank circuit operative when turned on to periodically switchably connect said second side of said second tank circuit to a ground return terminal of said DC source, said second tank circuit comprising a second capacitor connected in parallel with said second primary winding;
means for generating a DC voltage offset between said first circuit means and said second circuit means such that a first portion of said DC source voltage amplitude exists between said power input terminal and said intermediate terminal and a second portion of said DC source voltage amplitude exists between said intermediate terminal and said ground return terminal; and means for alternately turning on said first switch means and said second switch means at a rate determined by the resonant frequency of said first and second tank circuits.

13. An inverter-ballast power supply circuit for generating an output sine wave for powering one or more fluorescent lamps or the like from an unsmoothed DC voltage source operatively connected to said circuit between a power input terminal and a ground return terminal, comprising:

a transformer having first and second primary windings and at least one secondary winding adapted to be connected in series with a fluorescent lamp;

a first circuit including a first tank circuit having a predetermined resonant frequency, a first inductor connected in series between one side of said first tank circuit and said power input terminal and a first transistor connected to the other side of said first tank circuit operative when turned on to switchably connect said second side of said first tank circuit to an intermediate potential terminal, said first tank circuit comprising a first capacitor connected in parallel with said first primary winding;

a second circuit including a second tank circuit having a resonant frequency identical to said first tank circuit, a second inductor inductively coupled to said first inductor and connected in series between one side of said second tank circuit and said intermediate potential terminal, and a second transistor connected to the other side of said second tank circuit operative when turned on to periodically switchably connect said second side of said second tank circuit to a ground return terminal of said DC source, said second tank circuit comprising a second capacitor connected in parallel with said second primary winding;

means for generating a DC voltage offset between said first circuit means and said second circuit means such that a first portion of said DC source voltage amplitude exists between said power input terminal and said intermediate terminal and a second portion of said DC source voltage amplitude exists between said intermediate terminal and said ground return terminal; and means for alternately turning on said first transistor and said second transistor at a rate determined by the resonant frequency of said first and second tank circuits, said means including:

first current source means capacitively fed from said one side of said first tank circuit to the base of said first transistor for generating a current of sufficient amplitude to turn on and maintain on said first transistor;

second current source means capacitively fed from said one side of said second tank circuit to the base of said second transistor for generating a current of sufficient amplitude for turning on and maintaining on said second transistor; and steering means for alternately coupling the current generated by said first current source means to the base of said first transistor and the current generated by said second current source means to the base of said second transistor.

14. The inverter circuit of claim 13 wherein said steering means comprises third and fourth primary windings of said transformer, each inductively coupled to each other and to the first and second primary windings of said transformer such that the voltage across said first and second primary windings appears across said third and fourth primary windings, said third primary winding connected between the base of said first transistor and said intermediate terminal, said fourth primary winding connected between the base of said second transistor and the ground return terminal, each said third and fourth primary windings connected so as to have opposite polarity such that when said first transistor is on, said fourth primary winding couples the current from said second current source to the ground return terminal instead of to said second transistor and, when said second transistor is on, said third primary winding couples the current from said first current source to the intermediate terminal instead of to said first transistor.

15. The inverter circuit of claim 14 further comprising a first diode connected in series with said third primary winding, said first diode oriented so as to provide a positive bias voltage for the base of said first transistor, and a second diode connected in series with said fourth primary winding, said second diode oriented so as to provide a positive bias voltage for the base of said second transistor.

16. The inverter circuit of claim 13 further comprising means for causing the rapid switching off of each said first and second transistor, said means including a first diode connected between the base of said first transistor and said one side of said first tank circuit, and including a second diode connected between the base of said second transistor and said one side of said second tank circuit, each said diode oriented to conduct current in the direction from the base of its respective transistor to its associated said tank circuit.

* * * * *